United States Patent
Takegawa

(10) Patent No.: US 7,371,953 B2
(45) Date of Patent: May 13, 2008

(54) PUSH-BUTTON SPIKE SYSTEM FOR SUPPORT LEG

(75) Inventor: Akito Takegawa, Chiba (JP)

(73) Assignee: Pearl Musical Instrument Co., Chiba (JP)

( * ) Notice: Subject to any disclaimer, the term of this patent is extended or adjusted under 35 U.S.C. 154(b) by 527 days.

(21) Appl. No.: 10/826,377

(22) Filed: Apr. 19, 2004

(65) Prior Publication Data

US 2005/0150356 A1    Jul. 14, 2005

Related U.S. Application Data

(60) Provisional application No. 60/535,814, filed on Jan. 13, 2004.

(51) Int. Cl.
*G10D 13/02*    (2006.01)
(52) U.S. Cl. .................................... 84/422.3
(58) Field of Classification Search ................ 84/421, 84/422.2, 422.1, 422.3, 411 R, 83; 248/188.9, 248/88.8, 171, 462.1
See application file for complete search history.

(56) References Cited

U.S. PATENT DOCUMENTS

| | | | |
|---|---|---|---|
| 890,161 A | 6/1908 | Mueller | |
| 1,022,149 A | 4/1912 | Maphet | |
| 1,630,701 A | 5/1927 | Gladstone | |
| 2,127,035 A | 8/1938 | Kirlin | |
| 2,480,382 A * | 8/1949 | Pagliuso | 248/188.5 |
| 2,503,135 A | 4/1950 | Sikora | |
| 2,665,866 A | 1/1954 | Goldinger | |
| 2,919,618 A | 1/1960 | Slingerland, Jr. | |
| 3,942,856 A * | 3/1976 | Mindheim et al. | 200/51.09 |
| 4,381,690 A * | 5/1983 | Kimble | 84/422.3 |
| 4,721,275 A | 1/1988 | Benton et al. | |
| 4,974,457 A * | 12/1990 | Angst et al. | 73/863.81 |
| 5,251,528 A * | 10/1993 | Kurosaki | 84/422.3 |
| 6,031,170 A | 2/2000 | Hoshino | |
| 6,075,190 A * | 6/2000 | Mosser et al. | 84/421 |
| 6,316,706 B1 * | 11/2001 | Sammons | 84/327 |
| 6,399,865 B1 * | 6/2002 | Ishimatsu | 84/421 |
| 6,409,412 B1 | 6/2002 | Huang | |
| 6,883,530 B2 * | 4/2005 | Kawakami | 135/84 |
| 2004/0107983 A1 * | 6/2004 | Liao | 135/84 |

* cited by examiner

*Primary Examiner*—Edwin A. Leon
(74) *Attorney, Agent, or Firm*—Berenato, White & Stavish

(57) ABSTRACT

A spike tip structure for a support leg for a stand, which may be used for supporting a musical instrument. The tip structure comprises a main body; an elongated spike member disposed in a first aperture of said main body; an end cap fitted around a bottom portion of said main body, where the end cap has an opening through which said spike member is adapted to pass; and an internal locking assembly for locking said spike member in position with respect to said main body, wherein said spike member is resiliently biased to translate in said aperture of said main body. The tip structure further comprises a button member slidingly disposed in a second aperture of said main body, where the button member selectively disengages the internal locking assembly.

16 Claims, 5 Drawing Sheets

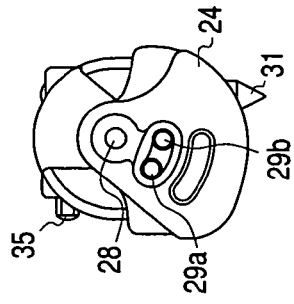
Fig. 6
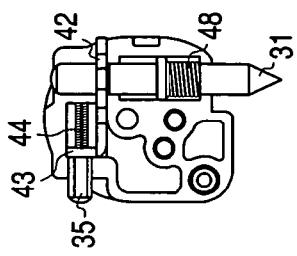
Fig. 7
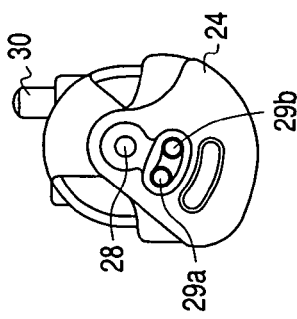
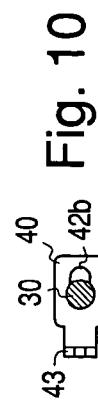
Fig. 10
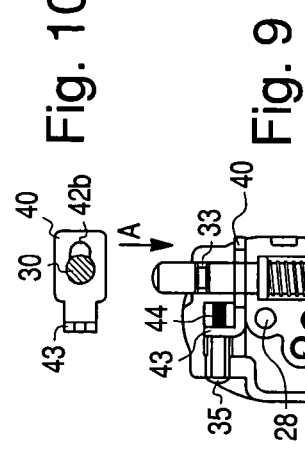
Fig. 9
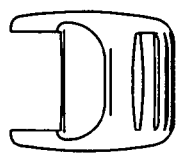
Fig. 12
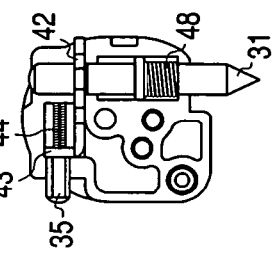
Fig. 11
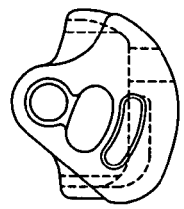
Fig. 13
Fig. 14
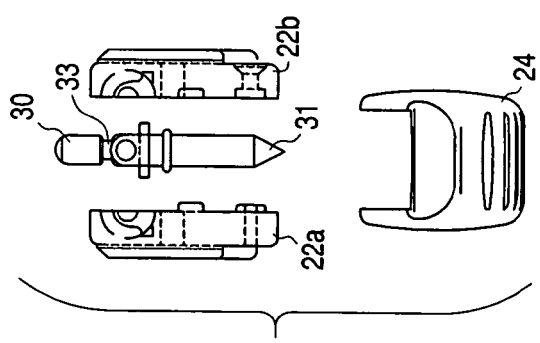
Fig. 8

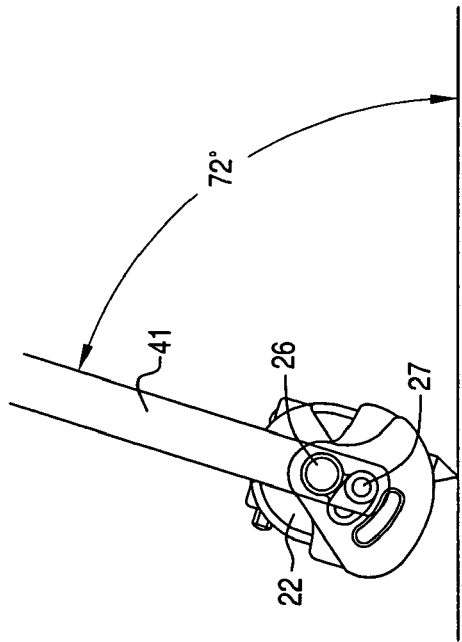
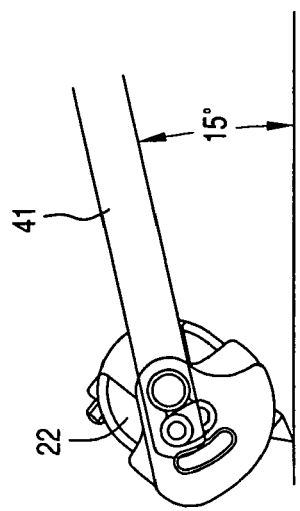
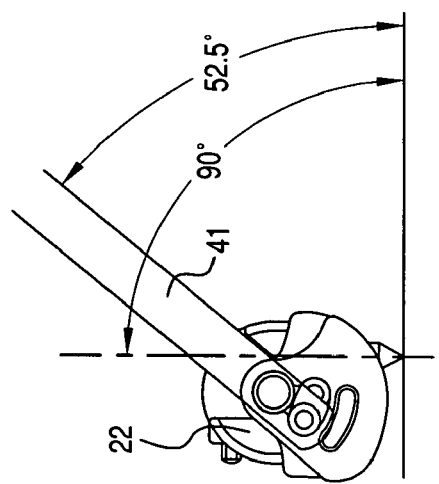
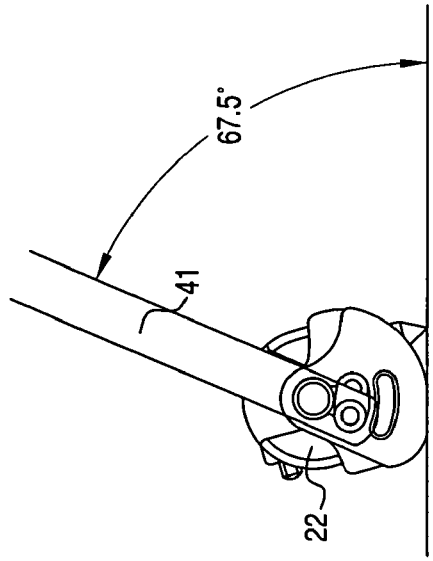

PUSH-BUTTON SPIKE SYSTEM FOR SUPPORT LEG

CROSS-REFERENCE TO RELATED APPLICATION

This Application claims the benefit under 35 U.S.C. 119(e) of U.S. Provisional Application No. 60/535,814 filed Jan. 13, 2004 by Akito TAKEGAWA.

BACKGROUND OF THE INVENTION

The present invention relates to a retractable tip structure for a support leg for a stand for musical instruments.

DESCRIPTION OF RELATED ART

FIG. 1 shows a prior art high hat stand which is supported by legs 41. It has a lower fixed cymbal 45 and an upper movable cymbal 46 at the top of the support 42. The upper movable cymbal 46 oscillates up and down through the operation of a foot pedal 50 at the bottom of the stand. There is a support base 43, an inner tube 44 that is adjustable in height inside the tube support 42 and that carries the lower cymbal 45, an operating rod 47 for the upper cymbal and a ground engaging member 48 below.

The high hat stand sometimes moves away from the performer, especially as the weight of the cymbals 45 and 46 increases, and due to the operation of the pedal 50 during a performance.

To prevent such movement, a cap 49 is fitted to the tip of each leg 41 and a spike bar 51 is provided having a tip 52 that sticks out at the bottom of the ground member 48. The tip 52 is brought into contact with the ground for preventing movement of the said high hat stand.

Because the spike bar 51 is provided on a support base 43 which constitutes the center of the stand surrounded by the three legs 41, if the length by which the tip 52 protrudes is small, the grounding force that applies to the tip 52 is reduced so that it will not prevent shifting. If the length of the tip protrusion is excessively large, on the other hand, one of the three legs 41 will be lifted and "float", reducing the stability of the high hat stand 1. Therefore, the length adjustment range of the tip 52 for shift prevention of the spike bar 51 is extremely small, demanding a severe adjustment precision.

FIG. 2 is alternate prior art arrangement with a reversible rubber/spiked foot member. In this design, a drumkey bolt 'k' is loosened and a spike tip 't' is rotated downward. FIGS. 3 and 4 illustrate further alternate prior art arrangements with rotatable rubber/spike tip foot members. With these designs, a main body member carries both a rubber member and a spike tip member. The main body is rotated relative to the leg and fastened in place.

Each of these designs requires a separate loosening tool to orient the spike tip relative to the leg of the support stand.

SUMMARY OF THE INVENTION

The invention seeks to overcome the above problems and provide a unique and improved foot member for a support stand. The tip structure of a new support leg is easily and simply adjustable for stabilizing the stand for the musical instrument and without causing shifting of the stand.

A tip structure for a support leg for a stand, comprises a main body; an elongated spike member disposed in a first aperture of said main body; an end cap fitted around a bottom portion of said main body, where the end cap has an opening through which said spike member is adapted to pass; and an internal locking assembly for locking said spike member in position with respect to said main body, wherein said spike member is resiliently biased to translate in said aperture of said main body.

The tip structure further comprises a button member slidingly disposed in a second aperture of said main body, where the button member selectively disengages the internal locking assembly.

Other objects and features of the invention are explained with reference to the attached drawings.

BRIEF DESCRIPTION OF THE DRAWINGS

FIG. 6 is a side view of the foot member with the spike member in a retracted position.

FIG. 7 is a side view of the foot member with the spike member in the projecting position.

FIG. 8 is an exploded view of the foot member.

FIG. 9 is a cross sectional view of the foot member with the spike member in the retracted position.

FIG. 10 is a top view of the L-shaped locking plate and spike member in the retracted position.

FIG. 11 is a cross sectional view of the foot member with the spike member in the projecting position.

FIG. 12 is a top view of the L-shaped locking plate and spike member in the projecting position.

FIG. 13 is a side view of the resilient end cap.

FIG. 14 is a front view of the resilient end cap.

FIG. 15 is a side view the foot member and support leg affixed in a position for a high hat stand.

FIG. 16A-16C shows different positions of the foot member for different type of drum systems. The foot member features an angling system

DESCRIPTION OF A PREFERRED EMBODIMENT

This invention relates to the tip structure of a support leg for a musical instrument, such as a high hat stand, etc. The invention may be applied to the cymbal, high hat or other type of musical instrument stand shown in FIG. 1. However, this invention is not affected by this configuration or number of legs.

Figure 1:
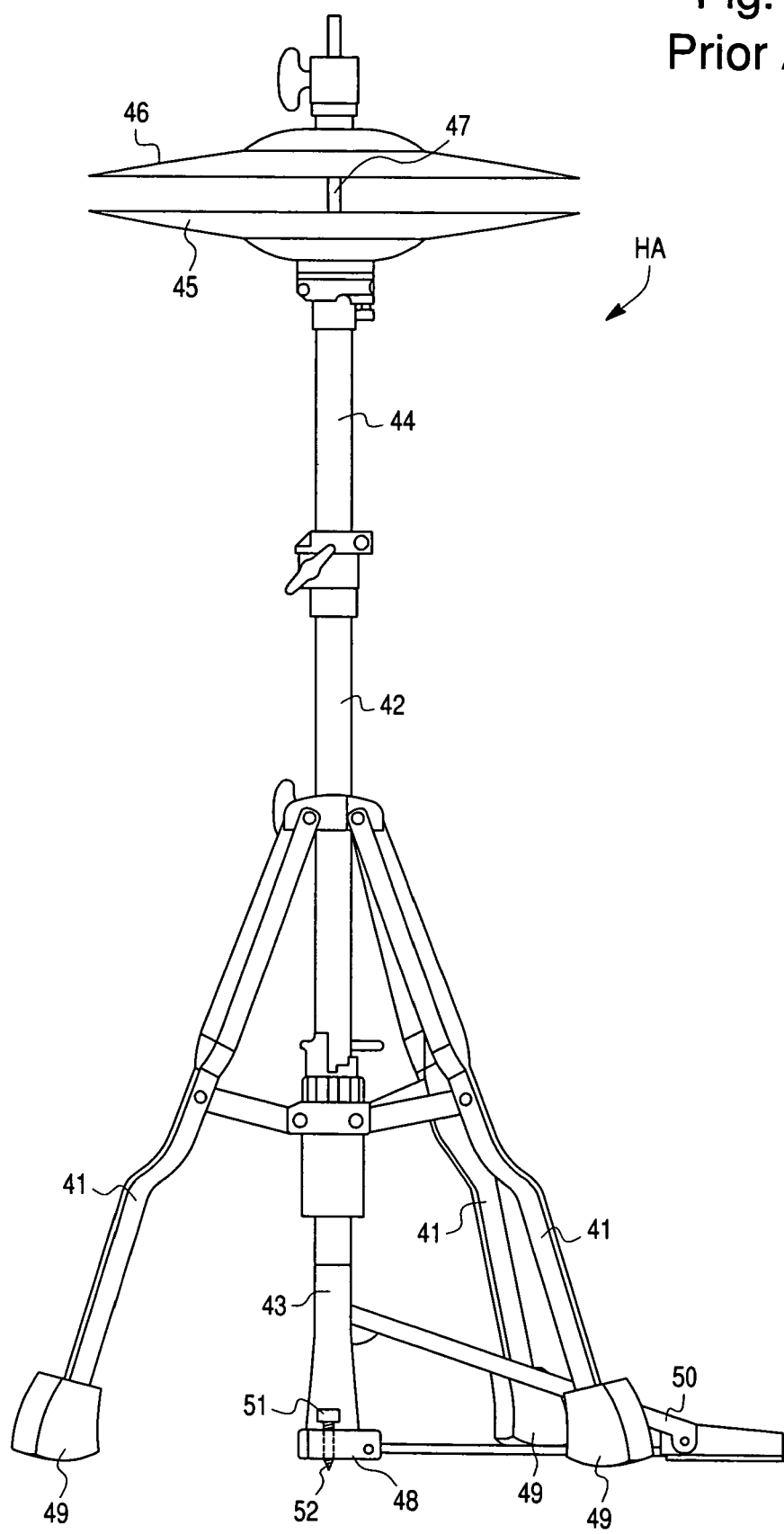
FIG. 1 is a side view of a prior art high hat stand.
Figure 2:
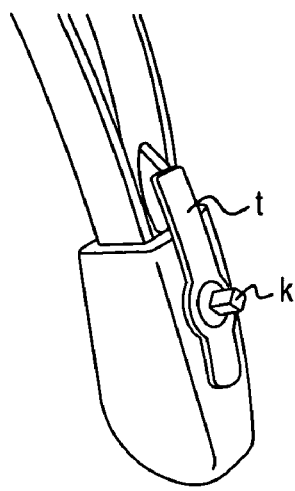
FIG. 2 is alternate prior art arrangement with a reversible rubber/spiked foot member.
Figure 3:
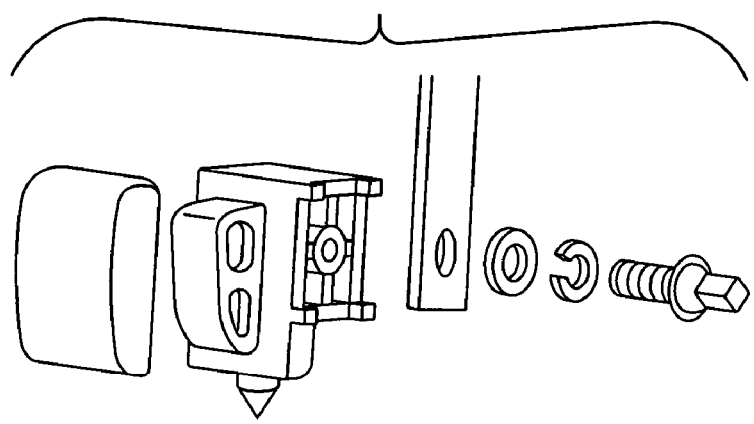
FIGS. 3 and 4 illustrate further alternate prior art arrangements with rotatable rubber/spike tip foot members.
Figure 4:
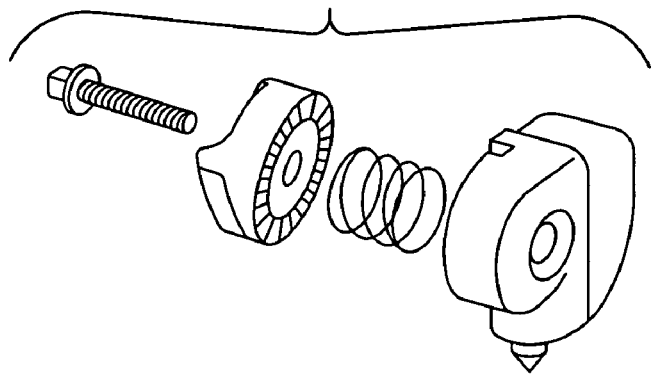
Figure 5:
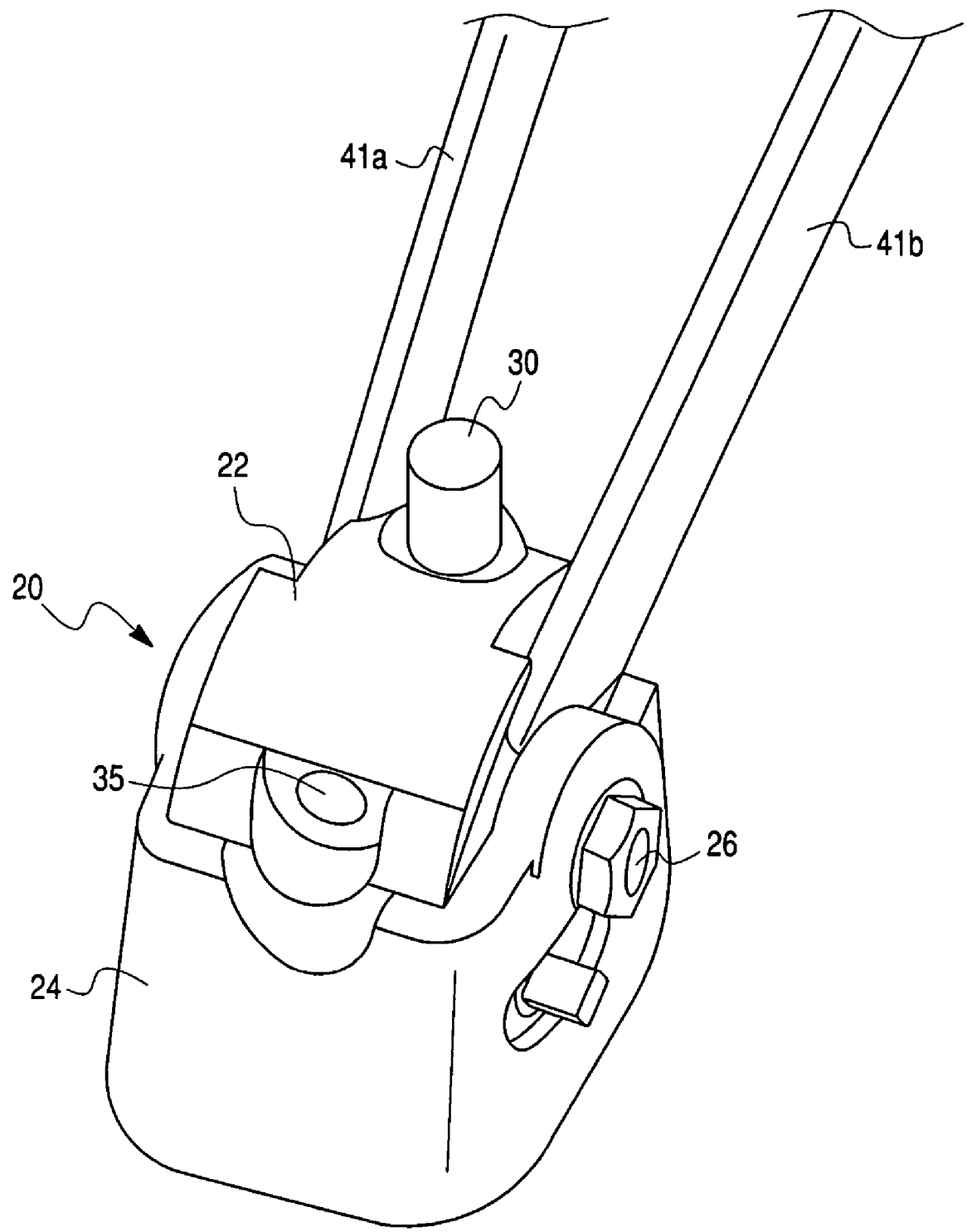
FIG. 5 shows a side view of a high hat stand having the tip structure of a support leg according to an embodiment of the invention.

The stand has support legs 41 as shown in FIG. 1. The foot member 20 of each support leg 41 is supported on both sides by the leg members 41a, 41b that are installed on the support (see FIG. 1). The foot member 20 includes a main body 22 and a resilient end cap 24 fitted to the bottom tip of the main body 22 of the foot member 20. An elongated spike member 30 is disposed in an aperture in the main body 22 and is resiliently biased to translate in said aperture of said main body. The tip 31 of the spike member 30 is provided in such a fashion as to be able to protrude from the resilient end cap 24 or disappear into the main body 22. As will be described in detail below, an internal locking assembly is disposed within the main body 22 for locking the spike member 30 in position with respect to the main body 22.

The foot member further comprises a button member 35 slidingly disposed in a second aperture of the main body 22, where the button member 35 when pushed selectively disengages the internal locking assembly to retract the spike member 30.

FIG. 6 is a side view of the foot member 20 with the spike member 30 in a retracted position. FIG. 7 is a side view of the foot member 20 with the spike member 30 in the projecting position whereby the spike's bottom end tip 31 protrudes from the end cap 24.

With reference to FIGS. 8-12, the internal structure of the foot member 20 will now be described. The main body 22 is preferably formed as a two-part body member 22a, 22b which sandwich the spike member 30. In the preferred embodiment, the spike member 30 is formed with a detent therein in the form of an annular groove 33. The internal locking structure comprises an L-shaped locking plate 40 formed with a latching portion 42 having a latching aperture 42a, 42b through which the spike member 30 passes and a leg portion 43 outwardly extending from the latching portion 42 substantially perpendicularly thereto. The latching aperture 42a, 42b has two different portions with two different diameters whereby the spike member 30 is disposed and freely moves in a large diameter portion 42a of the latching aperture 42a, 42b in the retracted position (see FIGS. 9 and 10). In the projecting position (FIGS. 11 and 12), a small diameter portion 42b engages the annular groove 33 of the spike member 30 to retain the spike member in a fixed position with respect to the main body 22.

The internal locking structure also comprises the unlocking button member 35, which acts on the leg portion 43 of the L-shaped locking plate 40, and the button member 35 disengages the small diameter portion 42b from the annular groove. In other word, the button member 35 moves the L-shaped locking plate with respect to the spike member 30 from the position shown in FIG. 12 to the position shown in FIG. 10. The internal locking structure also includes a retraction spring 48, which biases the spike member 30 toward the retracted position. When the button member 35 is pushed and the spike member 30 is moved into the large diameter portion 42a, the spike member 30 is retracted from the position shown in FIG. 11 to the position shown in FIG. 9.

A biasing spring 44 acts on the leg portion 43 of the L-shaped locking plate 40 opposite the button member 35. The biasing spring 44 causes the L-shaped locking plate 40 to engage the annular groove 33 of the spike member 30 when the spike member is pushed in the direction of arrow 'A' in FIG. 9.

The resilient end cap 24 is made of rubber, or the like, which is effective in preventing both vibrations and sliding of the capped leg. The cap is provided on the outer periphery of the tip of the main body 22 of the support leg, and has a bottom opening that corresponds to and is aligned with the spike member 30.

The spike member 30 is comprised of metal, etc. and has a bottom end tip 31. The spike member 30 is disposed in the aperture of the main body 22 in a way to enable the tip to protrude or to disappear freely.

The spike member 30 is formed to provide many versatile arrangements and orientations relative to the support leg. The main body 22 is fastened to the leg members 41a, 41b at the central mounting hole 28 via fastening members 26 (e.g., screw, rivet, nut/bolt, etc.). FIG. 15 is a side view of the foot member and support leg affixed in a position for a high hat stand where the support leg is fixed to the main body via the central mounting hole 28 using the fastening member 26 and the high hat fastening aperture 29b using a drumkey bolt 27.

FIGS. 16A-16C show different positions of the foot member for different type of drum systems where the support leg 41 is fixed to the main body 22 via the central mounting hole 28 using a fastening member 26 and the secondary fastening aperture 29a using a drumkey bolt 27. The foot member 20 features an angling system that keeps the tip 31 of spike member 30 effectively in contact with a floor or other substrate regardless of the spread of the support legs 41.

The foot member 20 enables preventing shifting of the stand by biting into the ground, which the high hat or other stand contacts by the tip 31 of the spike member 30 protruding from the end cap 24 of the foot member 20.

The automatic locking tip structure of the support leg makes it possible to engage/disengage the tip 31 of the spike member without the use of tools. When adjusting the angular orientation of the tip structure, it is necessary only to loosen the adjustment screw with a tuning key, to shift the screw to a prescribed location by the tuning key and to retighten the screw. Accordingly, adjustment of the angular orientation of the foot member and spike can be carried out speedily and easily, and using one hand.

The tip structure of the support leg according to the invention is not limited to use on a high hat stand, as in the example. It can be used for a cymbal stand, or a snare drum, or a chair for a drum, etc.

The automatic tip structure of the support leg of the invention can prevent any possible shift by causing the spike member to stick out of each end cap, which constitutes one point of support for the stand. In addition, the stand can be supported stably at all times. Moreover, its adjustment can be carried out extremely easily without the need for additional tools.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

The invention claimed is:

1. A tip structure for a support leg for a musical instrument stand, comprising:
    a foot member at a terminal end of said support leg, said foot member having a main body;
    an elongated spike member disposed in a first aperture of said main body; and
    an internal locking assembly for locking said spike member in a projecting position with respect to said main body;
    wherein said spike member is resiliently biased to translate in said aperture of said main body, and
    wherein said internal locking assembly comprises a resiliently biased locking plate having a latching portion that engages a detent formed in said spike member so as to retain said spike member in said projecting position with respect to said main body.

2. The tip structure according to claim 1, wherein said internal locking assembly is contained within said main body.

3. The tip structure according to claim 1, further comprising a retraction spring biasing said spike member toward a retracted position.

4. The tip structure according to claim 1, further comprising an end cap fitted around a bottom portion of said main body, said end cap having an opening through which said spike member is adapted to pass.

5. The tip structure according to claim 1, further comprising a button member slidingly disposed in a second aperture of said main body, said button member selectively disengaging said internal locking assembly.

6. The tip structure according to claim 5, further comprising a retraction spring biasing said spike member toward a retracted position when said button member is depressed.

7. The tip structure according to claim 1, further comprising at least one mounting hole disposed on a side of said main body for mounting said main body to said support leg.

8. The tip structure according to claim 7, further comprising at least one pivot limiting member for limiting a range of pivotal motion between said main body and said support leg.

9. The tip structure according to claim 1, wherein said locking plate is L-shaped.

10. The tip structure according to claim 9, wherein said L-shaped locking plate includes a leg portion outwardly extending from said latching portion; and
wherein said tip structure further comprises a biasing spring acting on said leg portion of said L-shaped locking plate so as to bias said L-shaped locking plate toward said spike member.

11. The tip structure according to claim 1, wherein said latching portion of said locking plate is formed with a latching aperture through which said spike member is adapted to pass.

12. The tip structure according to claim 11, wherein said latching aperture has two portions defining first and second diameters, said spike member adapted to freely pass through said first diameter and said spike member adapted to be locked by said second diameter.

13. The tip structure according to claim 12, wherein said detent of said spike member comprises an annular groove engaging said second diameter in said projecting position.

14. A tip structure for a support leg for a stand, comprising:

a foot member at a terminal end of said support leg having a main body;
an elongated spike member disposed in a first aperture of said main body;
an internal locking assembly for locking said spike member in a projecting position with respect to said main body;
a lock disabling assembly for selectively disengaging said internal locking assembly;
wherein said spike member is resiliently biased to translate in said aperture of said main body, and
wherein said internal locking assembly comprises a resiliently biased locking plate having a latching portion that engages a detent formed in said spike member so as to retain said spike member in said projecting position with respect to said main body.

15. The tip structure according to claim 14, wherein said lock disabling assembly comprises a button member slidingly disposed in a second aperture of said main body, said button member selectively disengaging said internal locking assembly.

16. A tip structure for a support leg for a musical instrument stand, comprising:

a foot member at a terminal end of said support leg, said foot member having a main body;
an elongated spike member disposed in a first aperture of said main body;
at least one mounting hole disposed on a side of said main body for mounting said main body to said support leg; and
at least one pivot limiting member for limiting a range of pivotal motion between said main body and said support leg;
wherein said spike member is resiliently biased to translate in said aperture of said main body.

* * * * *